UNITED STATES PATENT OFFICE.

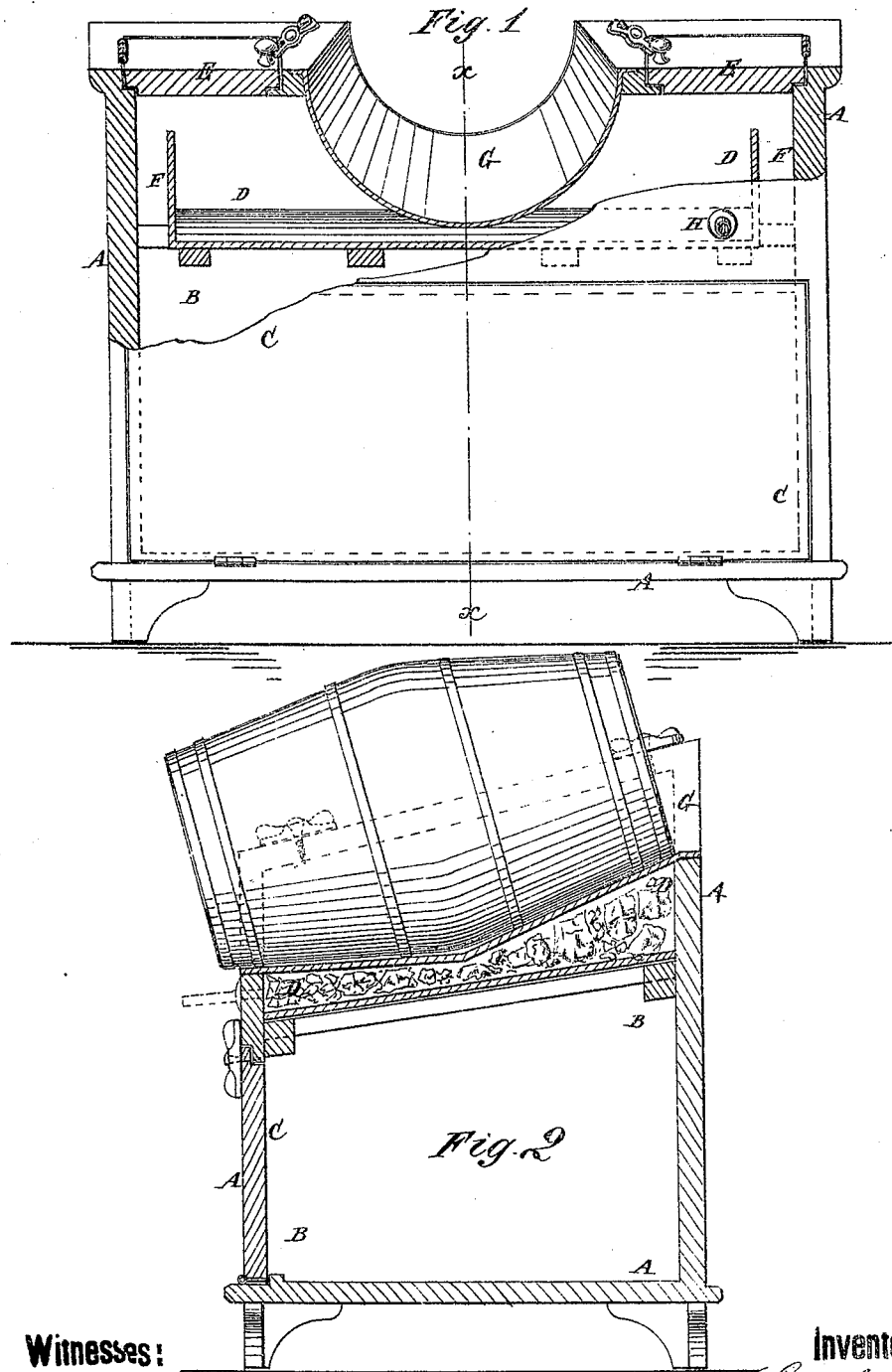

GEORGE NUSS, OF NEW YORK, N. Y.

IMPROVEMENT IN COMBINED REFRIGERATORS AND BEER-COOLERS.

Specification forming part of Letters Patent No. 140,636, dated July 8, 1873; application filed June 21, 1873.

*To all whom it may concern:*

Be it known that I, GEORGE NUSS, of the city, county, and State of New York, have invented a new and useful Improvement in Combined Buck-Beer Cooler and Refrigerator, of which the following is a specification:

Figure 1 is a front view of my improved device, partly in section, to show the construction. Fig. 2 is a vertical section of the same taken through the line $x\ x$, Fig. 1.

My invention has for its object to furnish an improved device which shall be so constructed as to adapt it to hold a beer-cask and keep it cool, and which may also serve as a refrigerator for preserving various articles that require to be kept cool. The invention consists in the box provided with a cooling-chamber, an ice-chamber, and one or more downwardly-projecting recesses, as hereinafter fully described.

A represents the box, which may be made of any desired size, and may be made with double walls packed with any suitable non-conducting material to prevent the entrance of heat. In the lower part of the box A is formed the chamber B, for receiving the articles to be kept cool, and to which access may be had through a door or doors, C, in the front of the box A. In the upper part of the box A is formed a chamber, D, to receive the ice, which is inserted through a door or doors, E, in the top of box A. The ice-chamber D is made shorter than the box A, so as to leave spaces F between it and the walls of the box A, to allow the cold air from the ice-chamber D to circulate through the chamber B. In the top of the box A is formed a recess, G, which is so formed as to receive a cask and hold it securely in such a position that its contents may be readily drawn off.

One, two, or more of the recesses G may be formed, as may be required.

By this arrangement, the recesses G projecting downward into the ice-chamber D, the cask and its contents will be kept cool until said contents may be wholly drawn off.

The ice-chamber D should be provided with a pipe, H, to carry off the waste-water.

Having thus described my invention, I claim as new and desire to secure by Letters Patent—

The box A provided with a chamber, B, an ice-chamber, D, and one or more downwardly-projecting recesses, G, substantially as herein shown and described, and for the purposes set forth.

GEORGE NUSS.

Witnesses:
JAMES T. GRAHAM,
ALEX. F. ROBERTS.